May 21, 1929.  A. F. EDMONSTON  1,714,353
DIRECTION SIGNAL
Filed Aug. 3, 1927   2 Sheets-Sheet 1
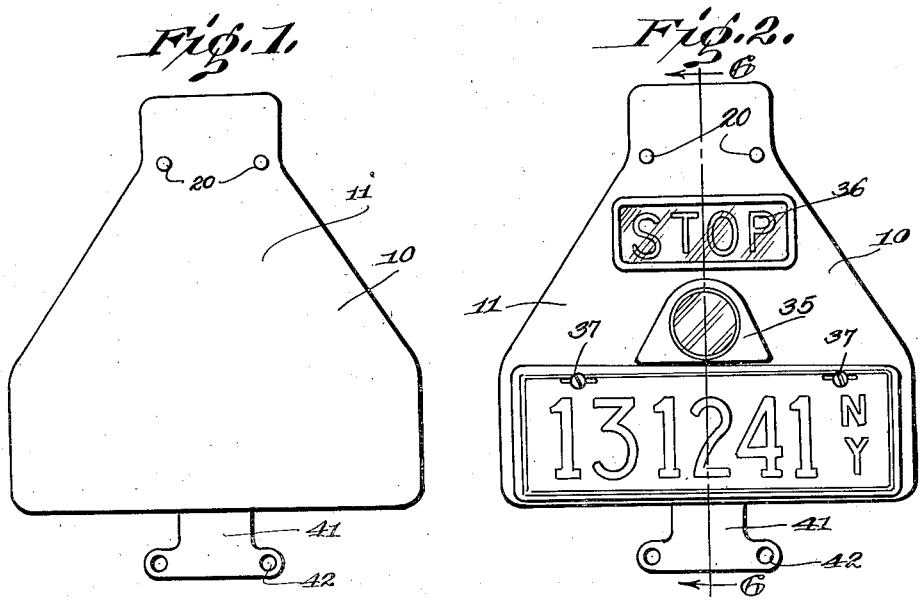
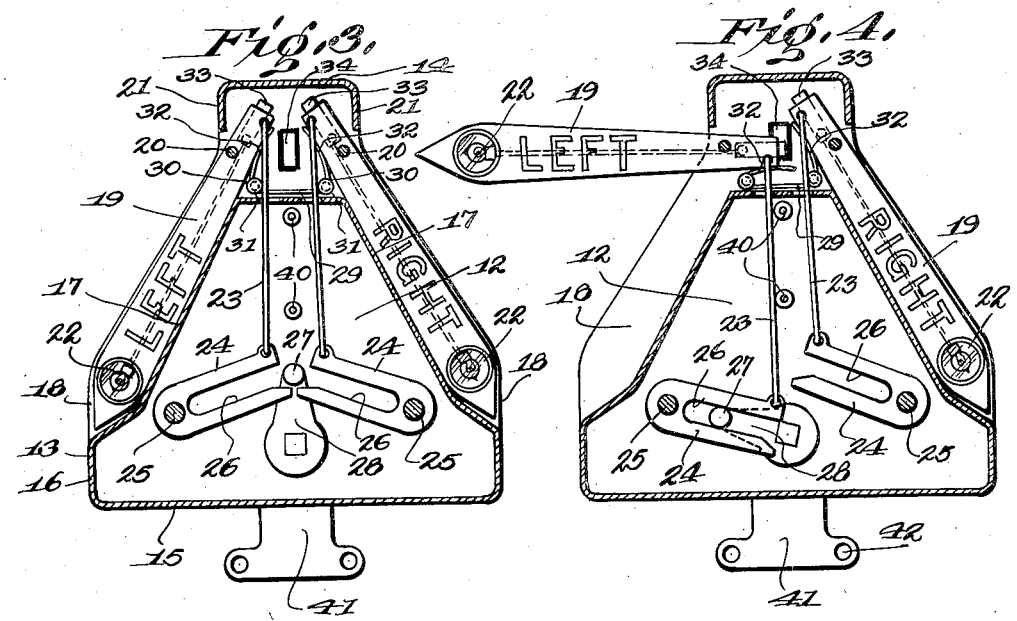
Inventor
Alvin F. Edmonston

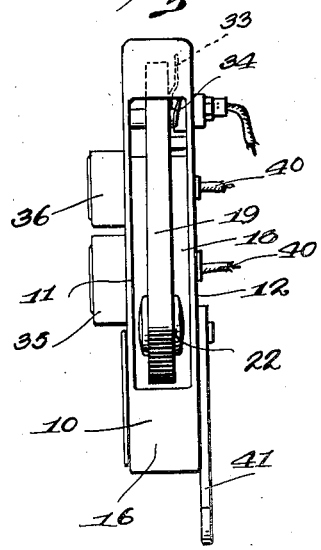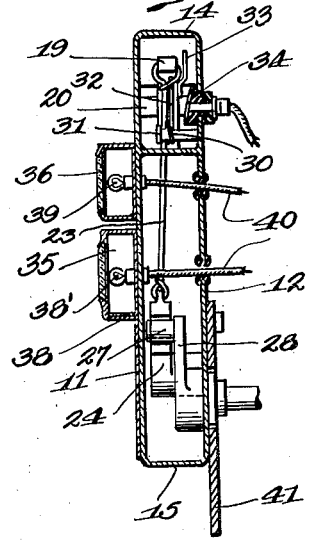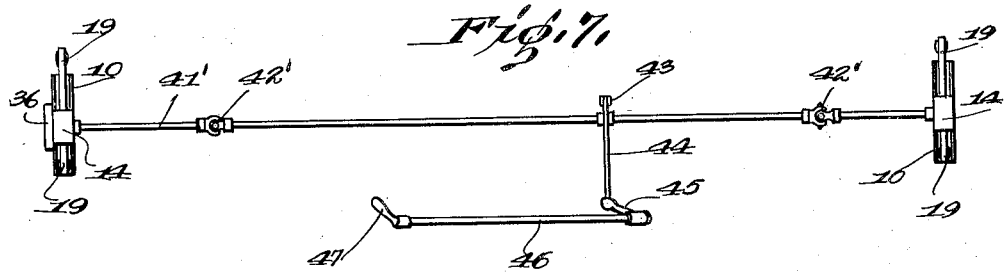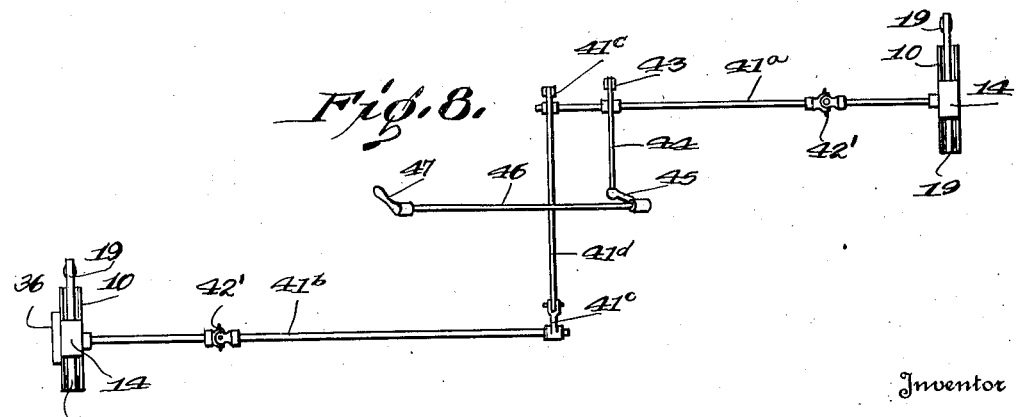

Patented May 21, 1929.

1,714,353

UNITED STATES PATENT OFFICE.

ALVIN F. EDMONSTON, OF MADISON, ILLINOIS.

DIRECTION SIGNAL.

Application filed August 3, 1927. Serial No. 210,319.

My present invention relates to a signal for attachment to a vehicle for indicating the direction the vehicle is about to travel in, and aims to provide a novel and improved device of this character having movable signal arms which normally lie within a casing and are invisible, but when it is desired to give a signal either one may be conveniently moved to a position so as to be easily seen.

With this principal object in view my invention contemplates the provision of a crank arm which may be swung in either direction for engaging and moving either of a pair of pivoted arms, each of which is operatively connected to a signal arm for moving either of the signal arms to indicate the direction a vehicle is about to turn.

A still further object of the invention is to provide similar direction indicating devices on a vehicle, one being arranged upon the forward end thereof while the other is on the rear end thereof, said signal indicating devices being connected in a manner so that the same may be operated simultaneously.

It is also an object of the invention to provide a device of the above indicated character, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:

Figure 1 is a front elevation of a signal arranged on the forward end of a vehicle, Figure 2 is a front elevation of a signal arranged on the rear end of a vehicle, Figure 3 is a vertical section through the casing of my improved signal, showing both of the signalling arms in the positions when the same are not in operation.

Figure 4 is a similar view showing one of the signalling arms in operative position for giving a signal, Figure 5 is a side elevation of a signalling device as used on the rear of an automobile, Figure 6 is a vertical section taken on line 6—6 of Figure 2, Figure 7 is a diagrammatic view illustrating the manner in which the front and rear signals are operatively connected together and the manner of operating same, and Figure 8 is a similar view showing the rear signal arranged so that the same may be positioned centrally of the vehicle.

Referring to the drawings the numeral 10 designates a casing having a pair of spaced walls 11 and 12, the numeral 11 indicating the front wall, while the numeral 12 indicates the rear wall. The walls 11 and 12 are connected together and held in proper spaced relation by side walls 13, top wall 14, and bottom wall 15. The casing 10 is of a peculiar shape being of greater width at the lower portion and gradually decreasing in width as it extends upwardly to the upper portion, as clearly shown in Figures 1, 2, 3, and 4 of the drawings. The side walls 13 extend directly across between the edges of the front and rear walls 11 and 12 at the lower portions thereof, as at 16, but are depressed inwardly of the edges of the front and rear walls at the upper portions, as indicated by the numeral 17. By constructing the side walls in this manner, pockets 18 are formed at opposite sides of the casing.

The pockets 18 are adapted to receive pivoted signal arms 19 when said signal arms are in inoperative position. The signal arms 19 are pivotally connected to the casing 10 by means of bolts 20, or the like, extending through the upper ends thereof and through the front and rear walls of the casing. By referring to Figures 3 and 4, it can be seen that the upper ends of the signal arms 19 are pivoted directly under the top wall 14 and that short depending portions 21 of the top wall partially enclose the upper ends of said signal arms. On one of the signal arms is printed the word "Left", while on the other is printed the word "Right". Thus it can be seen that when the signal arm having the word "Left" printed thereon is swung upwardly on its pivot 20 to the position indicated in Figure 4 of the drawings the same will indicate that the vehicle is about to turn to the left. The signal arms 19 are pointed at their lower free ends which aids in indicating the direction in which the vehicle is about to turn. On each of the arms 19 is arranged a small compartment 22 enclosing an electric light bulb which will permit the arms to be clearly visible at nighttime. It is to be noted that the portions 17 of the side walls form stops for limiting downward movement of the arms when the same are received within the pockets 18.

The arms 19 are pivoted to the casing adjacent one end thereof and to the short ends are connected rods 23, which extend downwardly in the casing 10 and are pivoted at their lower ends to operating arms 24 pivoted in the casing 10, as at 25. The operating arms normally extend toward each other and are provided with longitudinal slots 26 extending inward from the ends thereof which are adapted to receive an offset pin 27 on the free end of a crank arm 28, said crank arm being journaled in the rear wall 12 of the casing. By referring to Figure 4 it can be seen that when the crank arm 28 is turned to the left the offset pin 27 thereon will pass into the slot 26 of the operating arm on the left hand side and force said operating arm downwardly, which in turn will raise the lower end of the signal arm having the word "Left" thereon, as the operating arm is connected to the left signal arm by means of the connection 23.

In order that the signal arms 19 and the operating arms 26 will lie in proper position when the offset pin 27 is out of engagement therewith, a spring member 29 is provided, said spring member having a pair of coiled portions 30 thereon through which are extended pins 31 extending between the front and rear walls of the casing 10. The opposite free ends 32 of the spring member 29 engage the signal arms at all times and yieldably tend to hold the same within the pockets 18.

On each of the signal arms 19 is a contact 33 connected with the electric light bulbs arranged in the compartments 22 on the arms, said connecting means not being shown. On the rear wall 12 of the casing 10 is arranged a permanent contact 34 which is adapted to be engaged by the contacts 33 when the arms are swung to upper position, thus closing a circuit to the electric bulbs when the arms are raised so as to be visible.

On the front wall 11 of the signaling device arranged on the rear of the vehicle is provided a tail light casing 35, a stop light casing 36, and a plate beneath the stop light casing 36 for permitting a license plate to be attached, the license plate being attached by screws 37, or the like, passed through the wall 11, as clearly shown in Figure 6 of the drawings. The tail light casing 35 is of the usual structure, having a window 38 in its lower side for permitting light rays to shine on the license plate in order that the license plate may be clearly visible. In the tail light casing 35 and stop light casing 36 are arranged electric light bulbs 38' and 39 respectively which have connected therewith electric wires 40 extending through the rear and front walls of the casing 10.

The signals are connected to the vehicle by means of a bracket 41 rigidly attached to the back plate of each signal, said bracket having openings 42 therein through which rivets, or the like, are passed for mounting the signals.

In Figure 7 of the drawings, I have illustrated the signal devices arranged one in front of the other. When arranged in this manner, the lights may be mounted upon the front and rear left mud guards of the vehicle. A rod 41' has one end thereof attached to the crank arm 28 in one signal casing, while the opposite end thereof is connected to the crank arm 28 in the other casing. Thus when the rod is turned, the signal at the front of the vehicle will be operated at the same time the signal at the rear of the vehicle is operated. Any number of universal joints 42' may be used in order that the signals may be suitably located so as not to detract from the appearance of the vehicle. By providing the universal joints, the rod 41' may be arranged within the body of the vehicle. Intermediate the ends of the rod 41' is arranged a small crank arm 43 which has one end of a connecting rod 44 attached thereto, which in turn has its opposite end connected to a crank rod 45 of a bar 46. The bar 46 is adapted to lie adjacent the steering column of an automobile and has arranged upon its upper end a handle 47 in order that the rod 46 may be conveniently turned. It can be seen that when the rod 46 is turned the rod 41' will be turned so as to cause operation of certain signal arms.

In Figure 8 of the drawings, I have arranged the mechanism for operating the signal devices in a manner so that the signal at the forward end of the vehicle may be placed upon the left mud guard, while the signal at the rear of the vehicle is placed in the center of the vehicle. When arranging the devices in this manner, instead of providing one rod 41' I have provided two rods 41$^a$ and 41$^b$, which have the universal joints 42' therein and have their ends connected together by crank arms 41$^c$ and a connecting rod 41$^d$. By a similar structure it can be seen that the signal devices may be arranged at various points at the front and rear of a vehicle.

In operation, the signal arms to indicate a turn to the left may be raised in both the forward and rear signals by swinging the handle 47 to the left. When the handle 47 is swung to the left, crank arms 28 in the casings will be swung in a like direction, thus causing the offset pins 27 to enter the slots 26 in the pivoted arms 24 which are connected to the signal arms 19 having the word "Left" thereon. As the crank arms 28 are turned, they will force the pivoted arms 24 downwardly, thus causing a down pull on the connecting rods 23 which in turn will cause the arms 19 to be raised to signal indicating positions. The spring member 29 having the signal engaging contact portions 32 thereon will tend to return the signal arms and the mechanisms connected therewith to their initial positions after a signal has been given. When the signal arms are in signal indicating positions, the contacts 33 thereon engage the permanent contacts 34 so as to close a circuit to the bulbs arranged in the signal arms so that the signals may be easily understood at nighttime. It is to be noted that after a signal in one direction has been given it is necessary for the arms giving the signals to be returned to the pockets 18 before it will be possible to give a signal to indicate a turn in the opposite direction, as the pins 27 on the crank arms 28 will return the mechanisms before it will be possible for the pins to enter the slots 26 on the mechanisms for indicating the turning of a vehicle in the other direction.

Having thus described my invention, what I claim as new is:

1. A signal indicator for automobiles comprising a box-like casing having depressed side walls forming pockets and a top in the form of a hood extending from the upper ends of said pockets providing a housing opening into the upper ends thereof, signal arms pivoted in the housing and extending through the openings with the outer portions of said arms movable into and out of the pockets, together with means for operating the signal arms.

2. A signal indicator for automobiles comprising a casing contracted towards its upper end presenting inclined side walls, said side walls being depressed to form narrow pockets opening into the upper end of the casing below the top, signal arms pivoted near their upper ends in the upper end of the casing and normally lying within the pockets to be shielded thereby, operating levers pivoted in the body of the casing and connected by rods to the upper ends of the signal arms, and means for operating said levers.

3. A signal indicator for automobiles comprising a casing contracted towards its upper end presenting inclined side walls, said side walls being depressed to form narrow pockets opening into the upper end of the casing below the top, signal arms pivoted near their upper ends in the upper end of the casing and normally lying within the pockets to be shielded thereby, levers pivoted in the body of the casing below the pivoted ends of the arms and having slots extending into the same from the outer ends thereof, rods connecting said levers to the upper ends of the signal arms, and a crank arm on an operating shaft having a pin adapted to engage in the slots in the aforesaid levers for moving the arms out of the pockets on operation of the shaft.

4. A signal indicator for automobiles comprising a casing contracted towards its upper end presenting inclined side walls, narrow depressions in said side walls forming pockets, a top extending over the upper ends of the pockets to form a housing opening into the upper ends of said pockets, a wall extending between the inner walls of the pockets at the upper ends thereof, signal arms pivoted in the housing to lie normally in the aforesaid pockets and having their upper ends extending beyond the pivots, and coil springs having projecting ends engaging the projecting ends of the arms to move them into the pockets; together with rods connected to the projecting ends of the signal arms and to operating levers, and means for operating said levers to move the arms out of the pockets into signalling position.

ALVIN F. EDMONSTON.